United States Patent [19]
Jacob

[11] 4,037,031
[45] July 19, 1977

[54] BIPOLAR LEAD ACID BATTERY HAVING TITANIUM AND ZIRCONIUM ELECTRODE SUPPORTS

[75] Inventor: William Robin Jacob, Newport, England

[73] Assignee: Imperial Metal Industries (Kynoch) Limited, Birmingham, England

[21] Appl. No.: 583,273

[22] Filed: June 3, 1975

[51] Int. Cl.² .......................................... H01M 10/18
[52] U.S. Cl. ................................ 429/149; 429/204; 429/225; 429/228; 429/245; 429/249
[58] Field of Search ...................... 136/10, 26, 27, 19, 136/64, 65, 147; 429/149, 160, 204, 225, 228, 245, 249

[56] References Cited
U.S. PATENT DOCUMENTS

| | | | |
|---|---|---|---|
| 1,678,224 | 7/1928 | Kastelic | 136/10 X |
| 2,654,794 | 10/1953 | Zaugg | 136/10 X |
| 3,390,014 | 6/1968 | Eisler | 136/10 |
| 3,615,831 | 10/1971 | Ruben | 136/26 |
| 3,795,543 | 3/1974 | Poe | 136/10 |

Primary Examiner—Anthony Skapars
Attorney, Agent, or Firm—Cushman, Darby & Cushman

[57] ABSTRACT

A bipolar, lead acid battery incorporating titanium and/or zirconium electrode supports and having a fibre filling to maintain a pressure on the active mass located on the supports.

29 Claims, 4 Drawing Figures

BIPOLAR LEAD ACID BATTERY HAVING TITANIUM AND ZIRCONIUM ELECTRODE SUPPORTS

BACKGROUND OF THE INVENTION

This invention relates to batteries and has particular reference to lead acid batteries.

Lead acid battery technology is well established and current battery technology appears to have reached a plateau in its development. The conventional lead acid battery is formed from a series of cells, each cell having a negative and a positive electrode. The electrodes are formed of lead and have a series of plates which are positioned alternately in the cell, each plate being spaced from its neighbours by a series of separators. The plates have on their surfaces negative or positive paste which is the active component of the battery. As the paste is only poorly adherent to the lead plates, it is normally held in the interstices of a lead grid, and this means a large area of plate is necessary to obtain a reasonable number of ampere hours life from the cell. The cycle of charge and discharge tends to weaken the adherence of the paste to the plate and this permits some of the paste to fall the plate into the bottom of the battery. To prevent the material falling from the plates building up in the bottom of the battery to an extent that it touches both plates, and shorts out the battery, a well is provided at the bottom of the cell.

The lead is conventionally used because of its fairly good resistance to corrosion by the electrolyte, but it has the major disadvantage of being very heavy. The lead is also mechanically weak and it has not proved practical to have bipolar cells using lead electrodes. In a bipolar cell, a single electrode would form the wall between adjacent cells, one face of the electrode being a negative electrode for one cell and the other face being a positive electrode for the other cell. Such an arrangement leads to weight reductions by virtue of the omission of cell walls, volume reductions by virtue of the omission of the cell walls and to improved electrical efficiency as a result of the evening out of potential across the surface of the electrodes and shortening of the electrical connecting path from one cell to the next.

In U.S. Pat. No. 3795543, there is described lead acid storage battery which is stated to be bipolar. In fact, however, the battery is really a mono-polar battery since a true bipolar battery has a single electrode which is positive on one side and negative on the other. In the above-mentioned US Patent, the electrodes are in fact only positive electrodes or negative electrodes although they are very close together. The present invention is concerned with truly bipolar lead acid storage batteries in which the electrodes between the cells are negative on one side and positive on the other side.

SUMMARY OF THE INVENTION

By the present invention, there is provided a lead acid battery including at least two cells containing sulphuric acid electrolyte, there being a bipolar electrode comprising an electrically conducting impervious sheet of metal having on one side a first surface of titanium or a titanium alloy, and on the other side a second surface of zirconium or a zirconium alloy, the sheet forming a barrier wall between two adjacent cells, the first surface forming a support structure for the lead dioxide active mass of the positive electrode of one cell, and the second surface forming the support structure for the lead active mass of the negative electrode of the adjacent cell.

The first surface may be directly connected to the second surface, for example by a metallurgical bond which is preferably formed by hot rolling or explosive cladding. Alternatively, there may be a further metal between the two surfaces. Preferably, the further metal has a higher electrical conductivity than the titanium or titanium alloy or the zirconium or zirconium alloy. The further metal may be chosen from the group copper, aluminium and iron.

There may be a layer of lead between the first surface and the lead dioxide active mass. There may also be a layer of lead between the second surface and the lead active mass. There may be a foraminate structure on the first and second surface to retain the lead or the lead dioxide paste. The foraminate structure may be in the form of wire having an external surface of the same metal as the surface to which they are secured and may be secured to that surface, for example by spot welding.

The lead active mass may be mechanically biased towards the second surface by biassing means, and the lead dioxide active mass may be biassed towards the first surface by biassing means. There may be a separator between the positive lead dioxide and the biassing means and there may be a separator between the negative lead and the biassing means. The biasing means may be a resilient biassing means. The resilient biassing means may bias both the negative and positive active masses. The resilient biassing means may be an open celled foam or an open network fibrous structure. The fibrous structure may be bonded together. The biassing means may be formed of polypropylene, polyvinyl chloride or a polyester.

There may be an outer acid retaining wall for each cell, sealed at each end by a bipolar electrode, or, for the end cell of a multiplicity of cells, by a negative or positive electrode.

The electrode surfaces may be flat and the fibrous material may be formed of melded fibres as herein defined. The fibrous material may be an integral block.

The first and second surfaces may be intimately covered with lead and may then be pasted with positive paste and negative paste respectively.

The present invention further provides a lead acid battery including at least two cells containing sulphuric acid electrolyte, there being a bipolar electrode between the two cells forming a positive electrode for one cell on one side and a negative electrode for the second cell on the other side, the positive electrode having a positive lead dioxide active mass on a lead underlayer, and the negative electrode having a negative lead active mass on a lead underlayer, an effective separator against at least the positive active mass, and biassing means to bias the positive active mass against the positive electrode and to bias the negative active mass against the negative electrode.

There may be an open celled spacer between the separator and the active mass to assist the escape, in use, of gases from the active mass during charging. The negative electrode may have a zirconium layer under the lead and the positive electrode may have a titanium layer under the lead. Alternatively, both the negative and positive electrodes may have a zirconium layer under the lead. There may be a metal core between the negative and positive zirconium and/or titanium layers. The battery may comprise a stack of a plurality of cells, the electrode between each adjacent pair of cells being a bipolar electrode, and there being a mono-polar negative and positive electrode at each end of the stack.

The separators are micro-porous layers which suppress the formation of trees or dendrites which tend to grow outwardly from the negative active mass layers, to short out the cells. Separators also prevent shedding from the positive lead dioxide layers. Micro-porous separators are of course well-known in the art.

The pastes which would be used would be proprietary and conventional paste formed basically from a mixture of PbO, $Pb_3O_4$, $H_2SO_4$, Pb for the positive paste and with the addition of suitable expanders such as lamp black etc for the negative pastes. The particular paste used is not important to the invention.

When it is stated that the fibrous material may be formed of melded fibres, it is meant that the fibres may have a higher melting or softening point core, and a lower melting or softening point sheath. These fibres are matted together by conventional means, and are then heated to a temperature at which the sheath becomes tacky to bond touching fibres together, but at which temperature the core is unmelted. After cooling, a bonded fibrous material is formed. Such structures are available from the Fibres Division of Imperial Chemical Industries Limited, Harrogate, Yorkshire, England.

BRIEF DESCRIPTION OF THE DRAWINGS

By way of example, embodiments of the present invention will now be described with reference to the accompanying drawings, of which.

DESCRIPTION OF THE PREFERRED EMBODIMENTS

Figure 1:
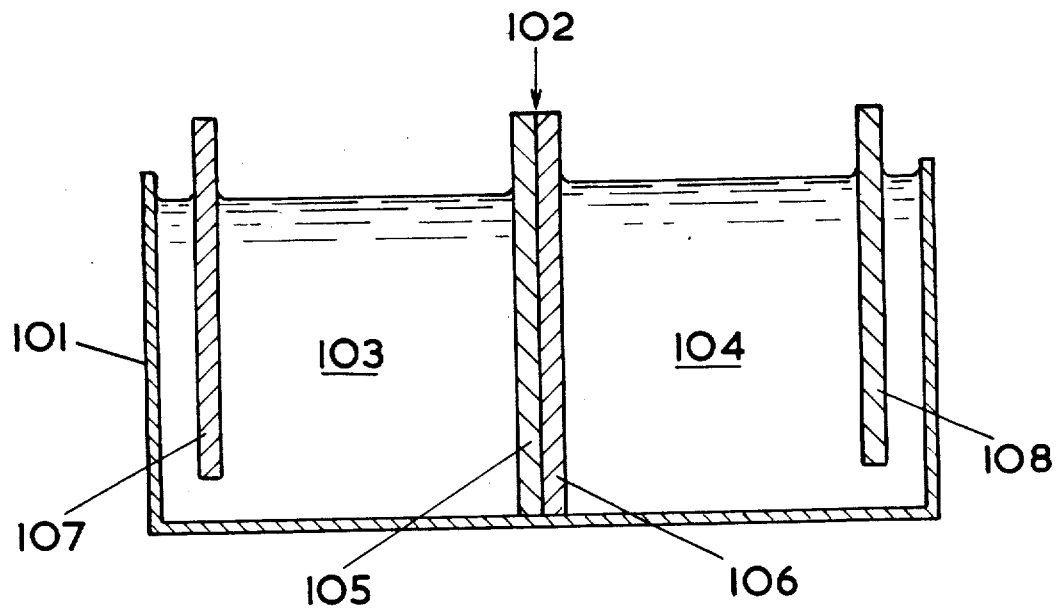
FIG. 1 is a diagrammatic cross-section of a two-cell lead acid accumulator.

The accumulator is in the form of a container 101 of plastic or rubber or other suitable material which has a dividing wall 102 to form two compartments 103 and 104. The dividing wall is a bipolar electrode having one face 105 of titanium and a second face 106 of zirconium. The compartment 103 forms a first cell and immersed in sulphuric acid located in the cell is a second electrode 107 which is a zirconium base electrode. The second compartment 104 also forms a cell, also contains sulphuric acid and an electrode 108 having a titanium base. The bipolar electrode 102 is secured to the walls of the container 101 in a water-tight manner.

The bipolar electrode 102 is manufactured by roll-bonding under an inert atmosphere a sheet of titanium to a sheet of zirconium. This produces a metallurgical bond between the two components which has a very low electrical resistance. Any other suitable method of joining the two sheets could be used, providing the method produces a low electrical resistance. As an example, explosive bonding of the two sheets could be used.

The bipolar electrode is coated with lead on both sides. Lead is electroplated onto the zirconium and the titanium surfaces after the surfaces have been etched. Subsequently, the electrode working pastes are applied to the surfaces. The titanium surface is pasted with a conventional $PbO + Pb_3O_4 + H_2SO_4 + Pb$ paste and the zirconium electrode is pasted with a basically similar paste which contains, in addition, suitable expanders such as lamp black etc, which are well-known in the art. The pastes are then formed by the passage of a suitable electric current to produce a substantially porous lead dioxide on the titanium positive surface and porous lead on the zirconium negative surface.

In use, the electrodes 107 and 108 are connected to an external load and the surfaces 105 and 106 act as independent electrode working surfaces with a current transfer taking place through the thickness of the electrode.

If required, there may be a metal between the components 105 and 106 to provide strength and to reduce the need for too great a thickness of the expensive metals titanium and zirconium. Such a metal may be aluminium or copper or iron. On the surfaces of the bipolar electrode there may be a foraminate structure such as a mesh of wires secured to the surface to enhance the surface area of the electrode. The importance of this is that it increases the keying of the lead or lead dioxide on the surface to enhance the electrical efficiency and electrical capacity of the accumulator. The wires may have an external surface of zirconium in the case of the zirconium surface and titanium in the case of the titanium surface. Alternatively, the foraminate structure may be an expanded metal mesh of titanium or zirconium. The zirconium or titanium surfaces may be formed of suitable alloys having comparable electrochemical properties to the base metals.

Figure 2:
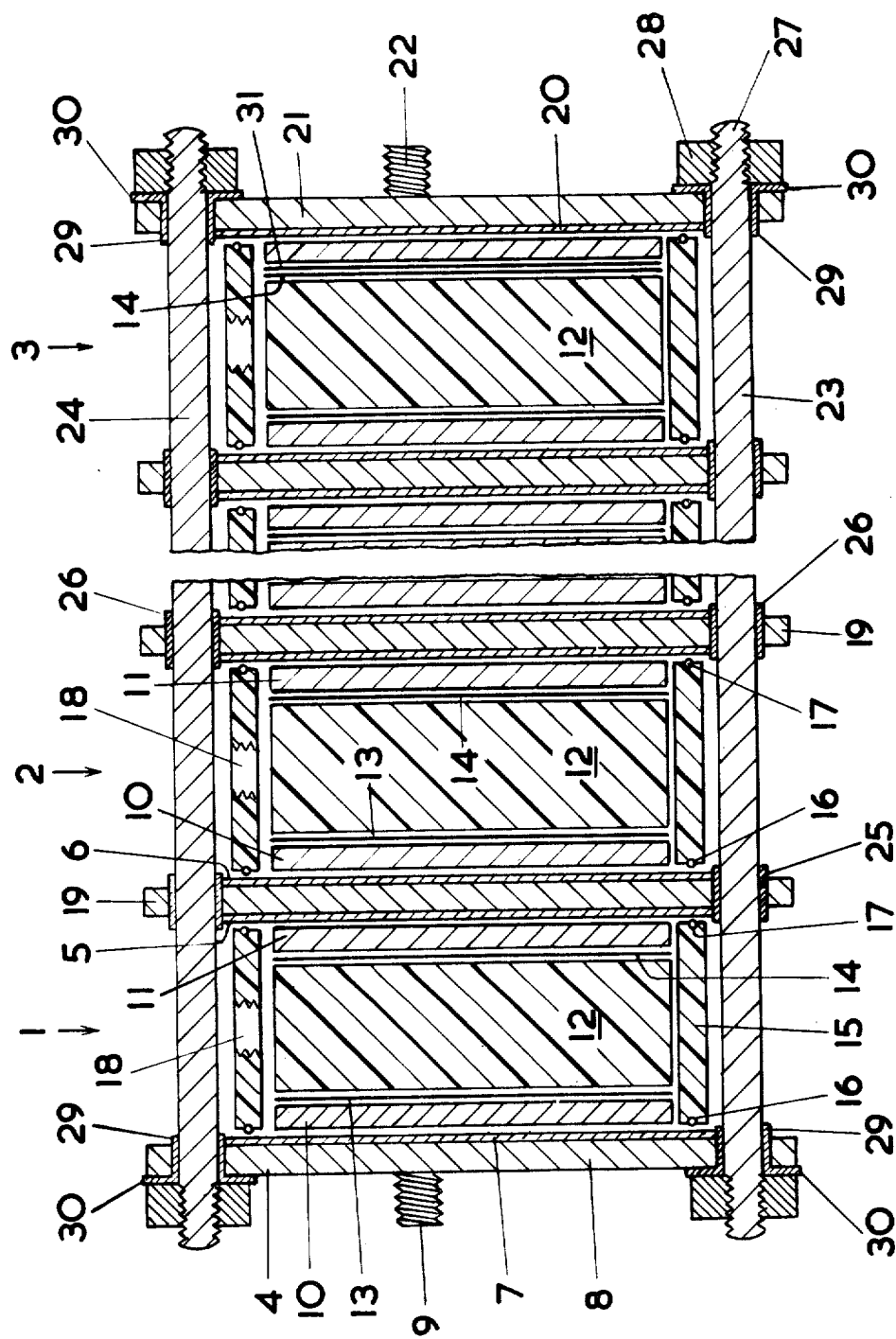
FIG. 2 is a cross-section, partially exploded, of a second form of lead acid accumulator.

FIG. 2 shows three complete cells 1, 2 and 3. The cell 1 has a positive electrode 4 and a zirconium negative electrode surface 5. The negative electrode 5 is a part of a bipolar electrode and is in electrical connection with the positive electrode 6 of the cell 2. Inside the cell 1, the positive electrode has a positive plate 7 which is formed of titanium. The titanium is mounted on a reinforcing and current distributing plate 8 of aluminum to which there is secured a connecting stud 9. Positive paste is shown at 10. Similarly, negative paste is shown at 11.

A block 12, of an open cell structure, is located between the paste layers 10 and 11 and separated from the sheets by separator plates 13 and 14. The open structure melded fibre block 12 is resilient and is, in use, compressed by about 20% to 50% to bias the separators 13 and 14 outwardly and thus to bias the layers 10 and 11 against their respective electrodes to resist paste shedding. Also located between the electrodes is an open-ended rigid polyvinyl chloride box 15 which as a pair of O-ring seals 16 and 17 in the open ends. When the battery is clamped together as explained below, the plates 7 and 5 compress the O-ring seals 16 and 17 to seal the cell. The block 12 is compressed as explained above to bias the layers 10 and 11 outwardly into contact with their electrodes. A filler hole 18 is located in one side of the box through which sulphuric acid electrolyte may be passed or topping-up water is added as desired. The sulphuric acid electrolyte fills the cell and extends between the two sheets 10 and 11.

Referring now to cell 2, the structure of the cell is the same as that of cell 1 except that the electrode 6 is one surface of the bipolar electrode which separates cells 1 and 2. Identical numbers have been used to indicate identical parts in cell 2. The core 19 of the bipolar electrode is typically formed of aluminium for its high conductivity and low weight. If, however, the extra rigidity provided by the aluminium core is unnecessary, then the core can be omitted. Both sides of the electrode could be formed of zirconium, if desired.

The cell 3 is again similar to cells 1 and 2 except that the negative electrode 20 which is fixed to backing plate 21 is not a bipolar electrode. A negative connecting post 22 is provided and is electrically connected to the backing plate 21.

Between the separator 14 and the paste layer 11, there is inserted an open bonded fibre structure 31 which aids the release of gas from the paste 11 during charging. The gas percolates upwardly through the open structure 31 to pass out eventually through the filler hole 18. A venting structure 31 may be located between each of the separators and its adjacent paste layer.

To hold the series of cells together, four aluminium rods are provided, one at each longitudinal edge of the battery. Two of the rods are shown at 23 and 24. The cores 19 extend beyond the box 15 and are apertured as at 25 to accommodate the rods 23 and 24. Insulating bushes 26 prevent electrical interconnections between adjacent electrodes. The ends of the rods 23 and 24 are threaded as at 27 and nuts 28 are screwed onto the rods to hold the entire assembly together. As can be seen, the insulating washers 29 have flanges 30 which prevent electrical connections being formed between the plates 8 and 21 and the rods 23 and 24.

Figure 3:
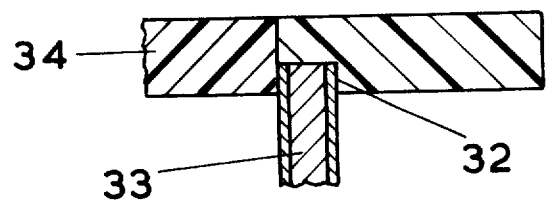
FIG. 3 is a cross-section of an alternative form of case seal.
Figure 4:
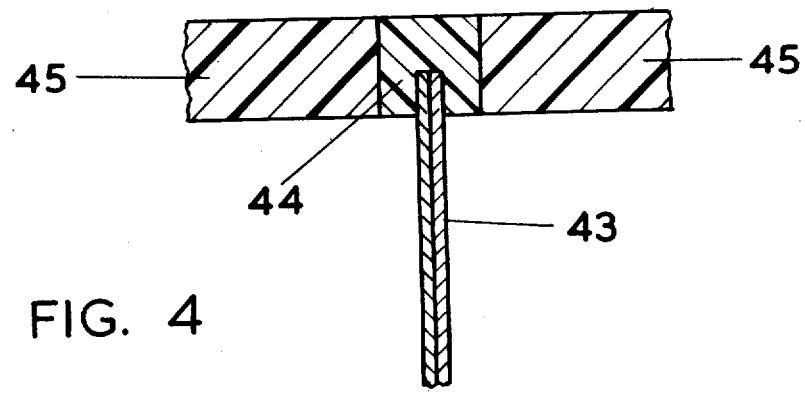
FIG. 4 is a cross-section of a further alternative form of case seal.

In an alternative form of the battery, the bipolar electrodes are heat sealed into a suitable case and these cases are then heat sealed together as shown in FIG. 3. The case has a recess 32 around one internal edge into which the bipolar electrode 33 is permanently sealed. The case 34 of the next adjacent cell is then heat sealed to the case of the first cell to form an integral unit. It can be seen that this makes the bipolar electrodes of a smaller dimension than that illustrated in FIG. 2.

In a further alternative form of battery, the bipolar electrode 43 is permanently moulded into a plastic frame 41. Case sections 45 are then sealed to the frame 44 to form an integral unit. It can be seen that the bipolar electrode moulded into its frame would be convenient to paste.

To manufacture the assembly, the bipolar electrodes are first assembled by roll bonding to produce a slab having a core of aluminium and a surface of titanium on one side and zirconium on the other side. These surfaces are then etched and electroplated with lead. A suitable paste as described above is then applied to each side, either manually or by machine. The electrodes are then located in their cases together with the various components, separators, fibre blocks etc in the order shown in the drawing, and the assembly is bolted or heat sealed together to form the complete battery. The battery, once assembled, is formed electrically to convert the paste on the titanium or positive surface to a porous lead dioxide and the paste on the negative or zirconium surface to a porous lead.

The structure described has an extremely low weight for the parts which are not active in the production and storage of electricity in the battery. For a particular battery, up to 83.65% of the total mass of the battery may be active material. This can be seen from Table I below which refers to a battery in which the features are as follows.

A positive paste thickness of 1mm is used. This is less than the maximum grid/paste particle distance in the conventional battery to give improved mass utilisation. The uniformity of current flow through a bipolar system should also aid mass utilisation. This uniformity of current flow occurs because there are no current lead-ins at one edge of the grid as are found in conventional batteries. A plate area of 200 + 150mm has been used and the mass of the paste assumes a 20% porosity in the paste.

In can normally be assumed that the mass utilisation of the negative paste will be at least as high as that of the positive and a 20% porosity this means a negative paste thickness of 0.75mm to match the 1mm of positive and to allow for the difference in density between the two pastes.

Sulphuric acid is used as the electrolyte and the maximum usable range of concentration of sulphuric acid, to ensure adequate conductivity, it taken to be specific gravity 1.3 (charged) to specific gravity 1.1 (is charged). The capacity of the acid is taken from G W Vinal, Storage Batteries, page 117, John Wiley & Sons, 1955. A volume of 521 milliliters is required for each cell leading to a cell width of 1.75cm between the separators.

On the assumption that the fibre structure in the cells will act as a sufficient support for the bipolar plates, only thin diaphragms will be needed. A cladding of 0.05mm thick zirconium on 0.1mm titanium is assumed. If enough pressure is exerted on the plates, separate sheets could be used, thereby avoiding the necessity for roll bonding. The plate area is taken as 225 × 175mm to allow for sealing. Clearly in a 12 volt battery, there will be five bipolar plates.

The end plates are 2mm thick aluminium to distribute the current and for strength with a 0.1mm cladding of either titanium or zirconium. In order to accommodate the bolt holes, the size of the end plates is 250 × 20mm.

The clamping bolts used are 0.5cm diameter aluminium rods, 15cm long with four being used. The end plate to end plate length of the battery will be 12.6cm. The case is of rigid PVC having a density of 1.4g/ml with rubber seals between the case and the plates. The thickness of the PVC is 5mm.

Conventional separators of porous PVC are incorporated to retain the active mass and prevent growth of the negative plates. This growth tends to be dendritic growth of the active mass which could effectively short out the battery or permit the active mass to become ineffective by virtue of the distance between the end of the dendrites and the electrode. In a bipolar system, shed active mass should be contained as otherwise it would fall to the cell bottom and could cause shorting. The thickness of the porous PVC separators is 0.5mm.

The fibre structure contributes very little to the mass of the battery. The material is most likely to be polyester and in particular Terylene. Terylene is a Registered Trade Mark of Imperical Chemical Industries Limited. Alternatively, PVC or polypropylene could be used. The density of material would be about 0.025 g/ml. The pressure provided on the plates to hold the active mass against the bipolar plates is envisaged as being about 50g/cm$^2$ to aid conduction and hence increase mass utilisation. The 12 volt battery has six cells, 2 volts being developed by each cell.

TABLE I

MASS OF COMPONENTS IN PROPOSED BIPOLAR BATTERY
50 THEORETICAL AMP HOURS, 12 VOLTS
(ie 30 ACTUAL AMP HOURS AT 60% MASS UTILISATION)
SUMMARY

| Component | Mass (g) | Percentage of total |
|---|---|---|
| Positive paste | 1354 | 16.41 |
| Negative paste | 1172 | 11.20 |

TABLE I-continued
MASS OF COMPONENTS IN PROPOSED BIPOLAR BATTERY
50 THEORETICAL AMP HOURS, 12 VOLTS
(ie 30 ACTUAL AMP HOURS AT 60% MASS UTILISATION)
SUMMARY

| Component | Mass (g) | Percentage of total |
|---|---|---|
| Electrolyte | 4376 | 53.04 |
| Bipolar plates | 183 | 2.22 |
| End plates | 327 | 3.96 |
| Clamping bolts | 32 | 0.39 |
| PVC case | 612 | 7.40 |
| Separators | 180 | 2.18 |
| Fibre structure | 15 | 0.18 |
| TOTAL | 8251 | — |

The paste can be of a considerable thickness, for example up to 1mm. Because of the resilient bias applied by the blocks 12, the active mass has no tendency to fall from the electrodes and a long life for the battery is therefore obtainable. In addition, high mass utilisation of the active mass is obtainable, much greater than can be obtained in present-day batteries. Assuming that the performance of the battery is controlled by the positive active mass, a mass utilisation of 65% should be obtainable. This permits an energy density in the battery of 60 watt hours/kg compared with approximately 30 watt hours/kg for present-day batteries. Even if the mass utilisation falls to 35%, which is the current commercial utilisation, the battery designed leads to an energy density in the range 44–52 watt hours/kg which is still significantly better than the 30 watt hours/kg conventionally obtained.

The electrodes themselves may be formed by roll-bonding the components together or it may be possible merely to use cleaned surfaces in contact with one another, the pressure from the biassing blocks 12 providing sufficient electrical contact between components. If required to increase the electrical conductivity between the paste sheets and the electrodes, the electrodes may be coated with lead or lead dioxide by any suitable means prior to pasting.

The melded blocks may be formed by obtaining fibres having an outer core of a lower melting point plastic and an inner core of a higher melting point plastic. The fibres are then intermingled to produce a block and the block is then heated to a temperature between the melting point of the two components of the fibres. The outer component then melts or becomes tacky and touching fibres are joined together. When the block has cooled, it is found to be an integral mass of material. Alternatively, the blocks may be an open celled foam in which at least 80% of the cell walls are absent so that an open celled skeleton of foamed material is provided which can receive the positive or the negative paste. The concentration of sulphuric acid used would be the same as that normally used, ie having a specific gravity of 1.3 when charged, and a specific gravity of 1.1 when discharged.

If the structure in the cells acts as a sufficient support for the bipolar plates, only thin diaphragms are necessary, in which case a cladding of 0.05mm thick zirconium on 0.1mm titanium may be used. Alternatively, a single layer of 0.1m of zirconium could be used as the bipolar electrode. The end plates would be typically 2mm thick of aluminum with a 0.1mm cladding of either titanium or zirconium.

The separators may be of conventional type, eg of porous PVC, microporous rubber or other suitable material, and are particularly useful on the negative plates to prevent growth of dendrites.

The density of the blocks 12 would be typically 0.025g/ml although of course other densities could be used. A particularly useful material for the foam would be a polyester, especially Terylene. Alternatively, polyethylene, polypropylene or polyvinyl chloride or other acid resisting non-conducting material may be used.

The corrosion rates of titanium and zirconium are in practice very low when used in batteries, being approximately 0.002mm per year for titanium at the positive plate potential and less than 0.001mm per year at the potential of either plate for zirconium. If the weight penalty associated with the use of lead is permissible, then lead bipolar electrodes could be used although they would normally have to have a greater thickness than the titanium and zirconium electrodes because of lead's greater corrosion rate, and poorer mechanical strength. This would, in particular, lead to severe problems of making acid-tight seals to lead bipolar plates.

I claim:

1. A lead acid battery including at least two cells containing sulphuric acid electrolyte, there being a bipolar electrode comprising an electrically conducting impervious sheet of metal having on one side a first surface of a material selected from the group consisting of titanium and a titanium alloy, and on the other side a second surface of a material selected from the group consisting of zirconium and a zirconium alloy, the sheet forming a barrier wall between two adjacent cells, the first surface forming a support structure for the lead dioxide active mass of the positive electrode of one cell, and the second surface forming the support structure for the lead active mass of the negative electrode of the adjacent cell.

2. A battery as claimed in claim 1 in which the first surface is directly connected to the second surface.

3. A battery as claimed in claim 2 in which the connection is by a metallurgical bond.

4. A battery as claimed in claim 1 in which there is a further metal between the two surfaces, the further metal having a higher electrical conductivity than the material of the first surface and material of the second surface.

5. A battery as claimed in claim 4 in which the further metal is selected from the group consisting of copper, aluminium and iron.

6. A battery as claimed in claim 1 in which there is a layer of lead between the first surface and the lead dioxide active mass.

7. A battery as claimed in claim 1 in which there is a foraminate structure on the first and second surfaces to retain the lead or the lead dioxide active mass.

8. A battery as claimed in claim 7 in which the foraminate structure is secured to a surface and is in the form of wire having an external surface of the same metal as the surface to which it is secured.

9. A battery as claimed in claim 1 in which the lead is mechanically biassed towards the first surface by biassing means, and in which the lead dioxide is biassed towards the second surface by mechanical biassing means.

10. A battery as claimed in claim 9 in which there is a separator between the positive lead dioxide and the biassing means.

11. A battery as claimed in claim 10 in which there is a separator between the negative lead and the biassing means.

12. A battery as claimed in claim 9 in which the biassing means is a resilient biassing means.

13. A battery as claimed in claim 12 in which the resilient biassing means biasses both the negative and positive active masses.

14. A battery as claimed in claim 13 in which the resilient biassing means exerts a substantially uniform pressure over the entire area of the sheet.

15. A battery as claimed in claim 14, in which the biasing means is a material selected from the group consisting of an open celled foam and a fibrous structure.

16. A battery as claimed in claim 15 in which the biasing means is formed of a material selected from the group consisting of polyethylene, polypropylene, polyvinyl chloride and polyester.

17. A battery as claimed in claim 1 in which there is an outer acid retaining wall for each cell sealed at each end by a bipolar electrode.

18. A battery as claimed in claim 1 in which the electrode surfaces are flat.

19. A battery as claimed in claim 15 in which the fibrous material is formed of molded fibres.

20. A battery as claimed in claim 15, in which the fibrous material is an integral block.

21. A battery as claimed in claim 1 in which the first and second surfaces are intimately covered with lead and pasted with positive paste and negative paste respectively.

22. A battery as claimed in claim 1 in which there is a stack of a plurality of cells, the electrode between each adjacent pair of cells being a bipolar electrode, and there being a mono-polar negative and positive electrode at each end of the stack.

23. A battery as claimed in claim 1 in which there is an outer acid retaining wall for each cell sealed at the end cell of a multiplicity of cells by an electrode.

24. A lead acid battery including at least two cells containing sulphuric acid electrolyte, there being a bipolar electrode between the two cells forming a positive electrode for one cell on one side and a negative electrode for the second cell on the other side, the positive electrode having a positive lead dioxide active mass on a lead underlayer on a titanium layer, and the negative electrode having a negative lead active mass on a lead underlayer on a zirconium layer, an effective separator against at least the positive active mass, and biasing means to bias the positive acitve mass against the positive electrode and to bias the negative active mass against the negative electrode.

25. A battery as claimed in claim 24 in which there is an open celled spacer between the separator and the active mass to assist the escape, in use, of gases from the active mass during charging.

26. A battery as claimed in claim 24 in which there is a metal core between the negative and positive zirconium and titanium layers.

27. A battery as claimed in claim 24 in which there is a stack of a plurality of cells, the electrode between each adjacent pair of cells being a bipolar electrode, and there being a monopolar negative and positive electrode at each end of the stack.

28. A lead acid battery including at least two cells containing sulphuric acid electrolyte, there being a bipolar electrode between the two cells forming a positive electrode for one cell on one side and a negative electrode for the second cell on the other side, the positive electrode having a positive lead dioxide active mass on a lead underlayer on a zirconium layer, and the negative electrode having a negative lead active mass on a lead underlayer on a zirconium layer, an effective separator against at least the positive active mass, and biasing means to bias the positive active mass against the positive electrode and to bias the negative active mass against the negative electrode.

29. A battery as claimed in claim 28 in which there is a metal core between the negative and positive zirconium layers.

* * * * *